United States Patent [19]

Fry

[11] Patent Number: 4,630,366

[45] Date of Patent: Dec. 23, 1986

[54] WEED CUTTING AND EXTRACTING TOOL

[76] Inventor: Merle A. Fry, 201 S. Waverly Rd., Apt. A-18, Lansing, Mich. 48917

[21] Appl. No.: 820,701

[22] Filed: Jan. 21, 1986

[51] Int. Cl.$^4$ ............................ A01B 1/16; B66F 3/00
[52] U.S. Cl. ...................................... 30/124; 254/132; 294/50.9
[58] Field of Search ............... 30/124; 294/50.8, 50.9; 7/116, 114; 254/132

[56] References Cited

U.S. PATENT DOCUMENTS

| | | | |
|---|---|---|---|
| 1,751,481 | 3/1930 | Tourrette | 294/50.9 |
| 1,973,417 | 9/1934 | Rieff | 30/124 X |
| 2,244,917 | 6/1941 | Muller | 30/124 |
| 2,806,733 | 9/1957 | Hund | 294/50.9 |
| 2,901,280 | 8/1959 | Hall | 294/50.8 |
| 3,152,788 | 10/1964 | Hardwidge | 294/50.9 X |
| 3,608,644 | 9/1971 | Ambrose | 294/50.9 |
| 3,957,299 | 5/1976 | Johnson et al. | 294/50.9 |
| 4,147,329 | 4/1979 | Rodriguez | 254/132 |
| 4,281,866 | 8/1981 | Atcheson | 254/132 X |
| 4,400,029 | 8/1983 | Delpidio | 294/50.9 |

Primary Examiner—Jimmy C. Peters
Attorney, Agent, or Firm—Ian C. McLeod

[57] ABSTRACT

An improved weed cutting and extracting tool with a blade mounted on a shaft opposite a gripping end is described. The tool includes a flat retaining spring which with the blade grasps or pinches the weed after the weed is cut. In particular, the tool includes an improved ejection mechanism for positively removing the weed from the tool using a handle which slides along the shaft connected by means of a rod to an ejector plate slideably mounted on the blade to lift the retaining spring and eject the weed.

20 Claims, 6 Drawing Figures

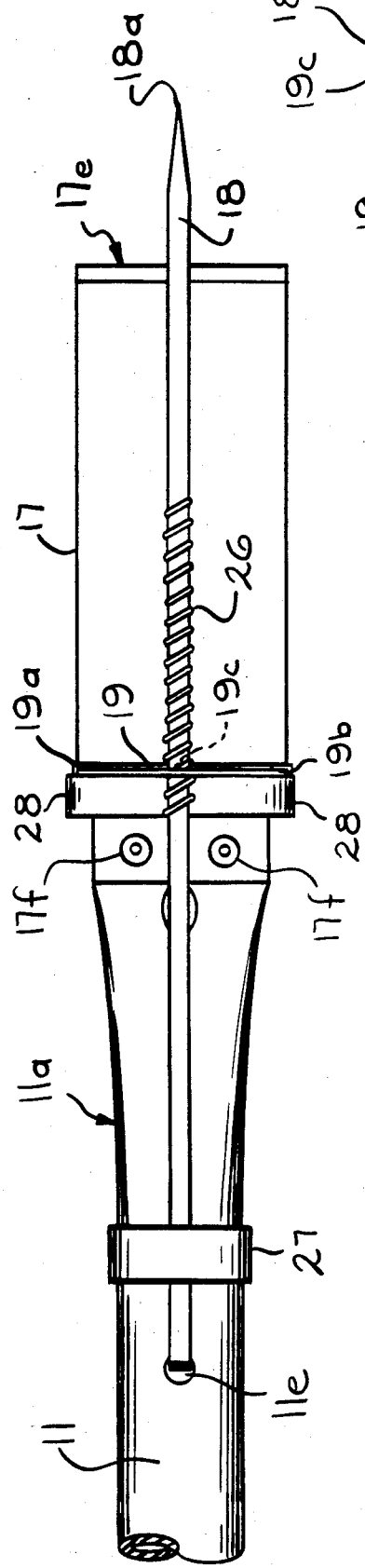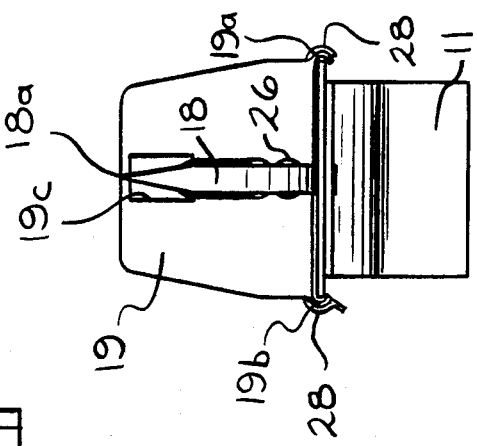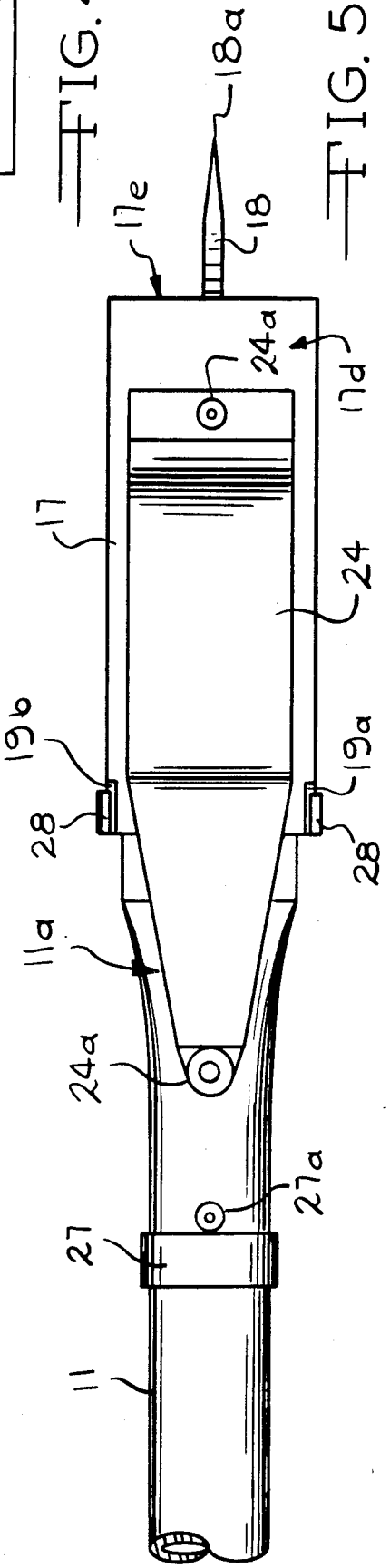

WEED CUTTING AND EXTRACTING TOOL

BACKGROUND OF THE INVENTION (1) Field of the Invention

The present invention relates to an improved weed cutting and extracting tool. In particular the present invention relates to a weed cutting and extracting tool which has an improved ejection mechanism for positively removing the severed weed from the tool.

(2) Prior Art

U.S. Pat. No. 3,608,644 (1971) to Ambrose describes a tool for cutting and extracting weeds. This tool uses a cutting blade and a pair of parallel flat springs spaced from and at the sides of the blade to hold the weed after it is cut. The problem with this tool is that the weeds are not positively grasped between the flat springs and the blade. Also the weed must be manually removed from between the flat springs and blade after extraction. U.S. Pat. Nos. 1,973,417 (1934) to Rieff and 2,901,280 (1959) to Hall also describe devices with claws which grasp the weed. The extracted weed must be manually removed from the Rieff tool. The Hall tool only loosely holds the weed which is removed by inverting the tool.

Numerous attempts have been made by the prior art to produce tools with means to release the weed on the handle at the gripping end of a shaft and opposite to the cutting blade. U.S. Pat. Nos. 1,751,481 (1930) to LaTourrette; 2,806,733 (1957) to Hund and 4,400,029 (1983) to Delpidio show devices where the release mechanism lifts one member from the engagement with the weed and cutting blade; however, there is no positive ejection of the weed from the tool. U.S. Pat. No. 2,244,917 (1941) to Muller shows an ejector mechanism which pushes the extracted weed from tines on a weed clamping member. The Muller tool is very complicated.

OBJECTS

It is therefore an object of the present invention to provide a weed cutting and extracting tool which is simple to construct and to operate. It is further an object of the present invention to provide a preferred tool with a weed ejection mechanism which positively ejects the weed from the tool after it has been cut and extracted from the ground. These and other objects will become increasingly apparent by reference to the following description and the drawings.

IN THE DRAWINGS

FIG. 3 is a right end view of the tool shown in FIG. 1 particularly showing a point on the end of the flat retaining spring which is preferred.

FIG. 4 is a top plan view of the preferred tool shown in FIG. 1 particularly showing the details of the ejector plate and flat retaining spring.

FIG. 5 is a bottom plan view of the preferred tool shown in FIG. 1 particularly showing a wedge mounted on the blade.

GENERAL DESCRIPTION

Figure 1:
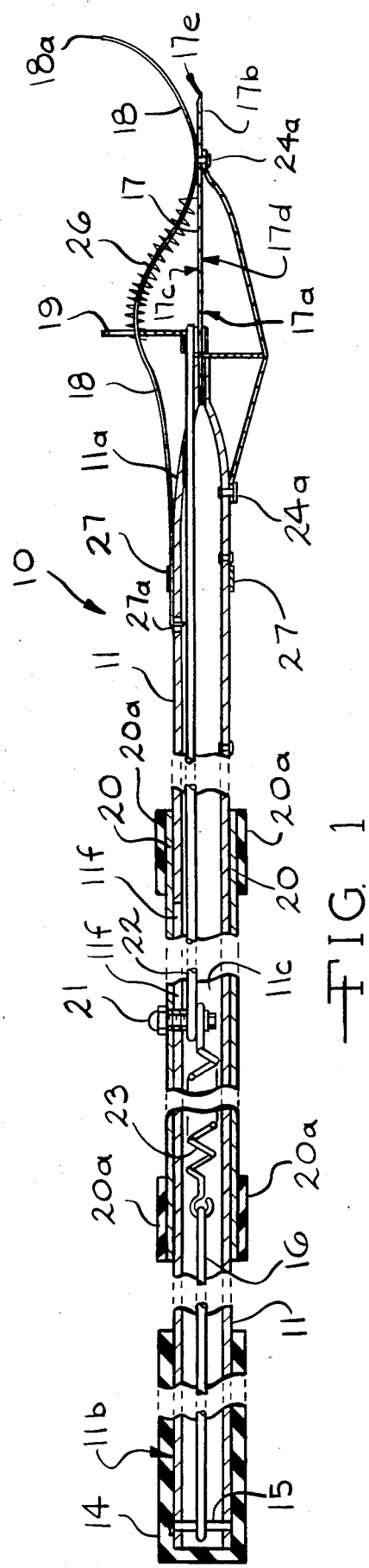
FIG. 1 is a front view in partial section of the preferred weed cutting and extracting tool of the present invention particularly illustrating a weed ejector mechanism including a weed ejection plate and flat retaining spring on a cutting blade in their rest position and also illustrating an elongated shaft mounting the blade and having a re-extension spring for a handle operating the mechanism.

The present invention relates to an improvement in a tool for cutting and extracting weeds from the ground by means of a blade means with a cutting edge provided at a first end of an elongate shaft means and a gripping portion at a second opposite end wherein the blade means is inserted into the ground to cut the weed, which comprises: an elongate resilient retaining means with an attached end mounted on the first end of the shaft means and a free end opposite the attached end, wherein the resilient means extends over most of the blade means, is in contact with the blade adjacent the cutting edge and at the free end curves away from the cutting edge and wherein the weed is grasped between the resilient means and the blade means during and after cutting of the weed.

The present invention further relates to an improved tool for cutting and extracting weeds from the ground which comprises: an elongate shaft means having a longitudinal axis and opposed first and second ends along the axis; a flat blade means having top and bottom ends and top and bottom sides mounted on the first end of the elongate shaft means parallel to said axis, wherein said bottom end of said blade means has a weed cutting edge; and a flat retaining spring means with a connected end attached to the first end of the elongate shaft and extending from the connected end over the top side and between the top and bottom ends of the blade and in contact with the blade adjacent the cutting edge and curved away from the cutting edge at the free end, wherein the weed is grasped between the blade means and the flat spring means during and after cutting of the weed by the blade.

Finally the present invention relates to a preferred improved tool for cutting and extracting weeds from the ground which comprises: an elongate shaft means having a longitudinal axis with opposed first and second ends along the axis; a flat blade means having top and bottom ends and top and bottom sides mounted on the first end of the elongate shaft means parallel to the axis, wherein the bottom end of the blade means has a weed cutting edge; a flat retaining spring means with a connected end attached to the first end of the elongated shaft and with a free end extending from the connected end over the top side and between the top and bottom ends of the blade so as to be in contact with the blade adjacent the cutting edge and curved away from the cutting edge at the free end wherein the weed is grasped between the blade means and the flat spring means during and after cutting of the weed by the blade; an ejector plate means moveably mounted adjacent the top side of the blade so as to be linearly moveable towards and back from the bottom end of the blade parallel to the axis and supporting the flat spring, wherein the flat spring is lifted from contact with the blade when the ejector means is moved towards the bottom end to eject the weed grasped between flat spring means and blade means from the tool; and a linearly moveable handle means mounted between the first and second ends and along the axis of the elongate shaft means and connected to the ejector plate means to move the ejector means towards and away from the bottom end of the blade means.

SPECIFIC DESCRIPTION

FIGS. 1 to 6 show the details of the weed extracting device 10. The weed extracting device 10 includes an elongated shaft 11 having first end 11a and second end 11b and also including a hollow inside portion 11c. A handle grip 14 is mounted at the second end 11b of the shaft 11 for holding the weed extracting device 10. A blade 17 having top and bottom ends 17a and 17b and top and bottom sides 17c and 17d is mounted on the first end 11a of the elongated shaft 11 by rivets 17f. The blade 17 also includes a cutting edge on end 17e for cutting the weeds.

FIGS. 1 to 6 also show a flat spring 18 mounted over the blade 17 at the first end 11a of the shaft 11 by a retainer sleeve 27. The sleeve 27 is press fit onto the spring 18 over a slot (not shown) in the sleeve 27 against a rivet 27a which serves as a stop. One end of the spring 18 has a right angle bend which fits in hole 11e in shaft 11. The flat spring 18 holds the weed against the blade 17 before removal. The flat spring 18 preferably includes a pointed tip 18a with a coiled spring 26 secured around the flat spring 18 for ejection of papers impaled on the pointed tip 18a. An ejector plate 19 is mounted on the top side 17c of the blade 17. The ejector plate 19 includes runners 19a and 19b which allow the plate 19 to move between the top end 17a to the bottom end 17b of the blade 17. The runners 19a and 19b are held in place by retainer clip 28. The ejector plate 19 also includes an aperture 19c (FIG. 4) in which the flat spring 18 is mounted so as to guide the spring 18.

Figure 2:
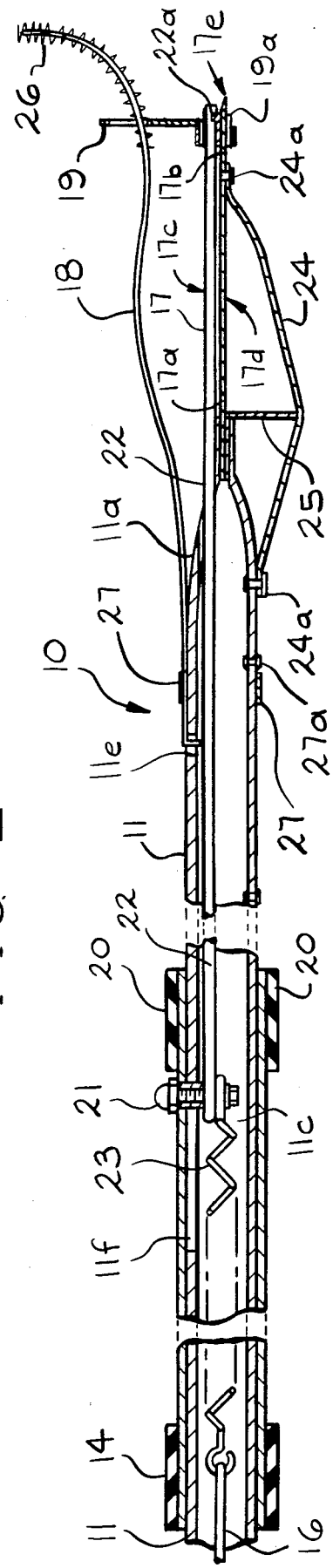
FIG. 2 is a front view of the weed cutting and extracting tool of FIG. 1 showing the ejection plate in its extended position after pushing and then removing a weed from between the cutting blade and the flat retaining spring using the handle.
Figure 6:
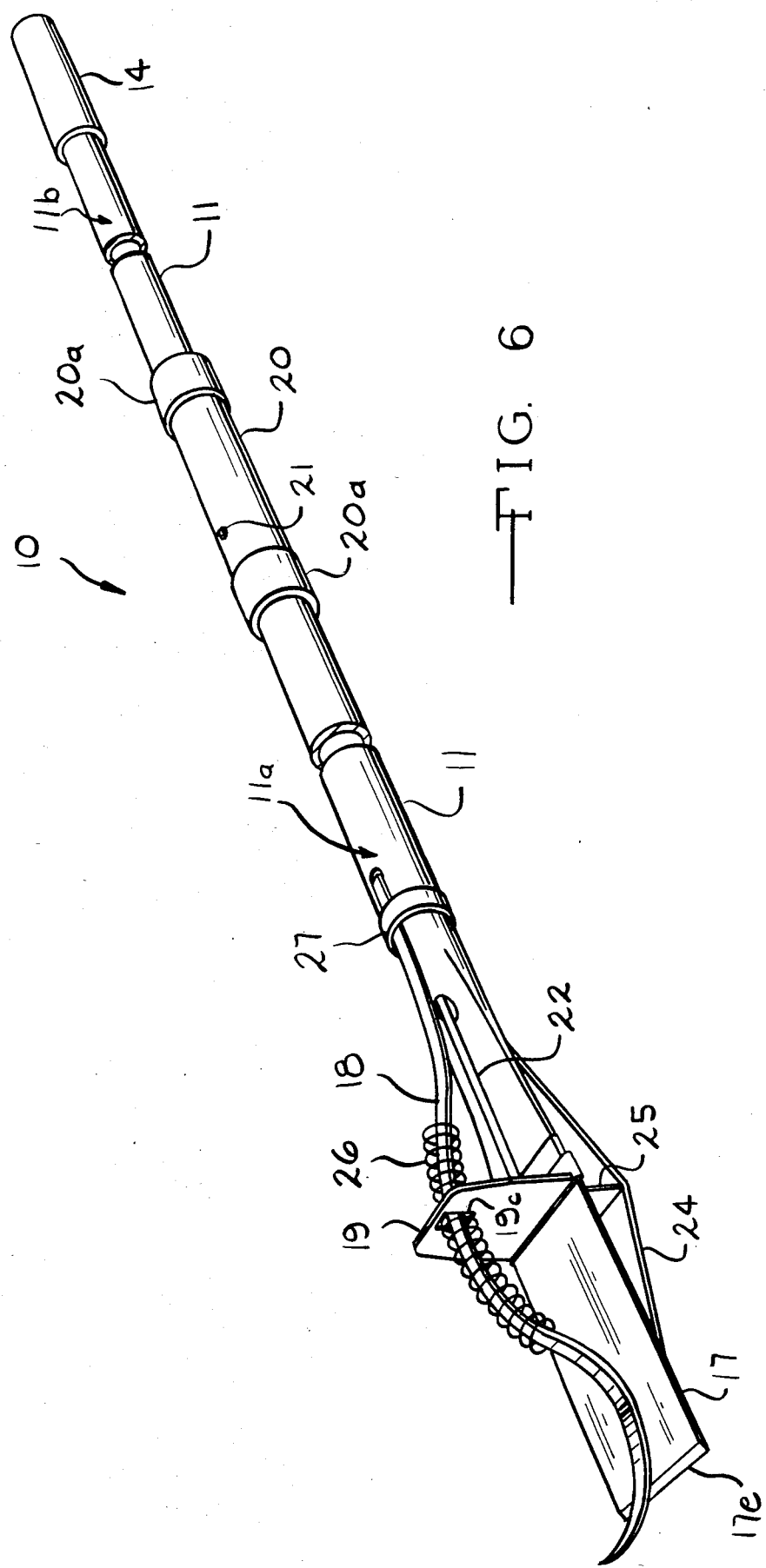
FIG. 6 is an isometric view of the weed cutting and extracting tool of the present invention.

A movable handle 20 with end caps 20a is mounted midway between the first and second ends 11a and 11b of the shaft 11. The moveable handle 20 operates by having a bolt 21 extending into a slot 11f in the shaft 11 and connected to a moveable rod 22 located in the inside portion 11b of the shaft 11. The moveable rod 22 is connected by an end hook 22a to the ejector plate 19. The moveable rod 22 is connected to a re-extension spring 23 mounted on the rod 22 and connected to a metal wire 16 for retraction of the ejector plate 19, rod 22 and handle 20 as shown in FIG. 1. The metal wire 16 is secured to a pin 15 which is mounted through the second end 11b of the shaft 11. The metal wire 16 merely serves to shorten the length of the spring 23. When the moveable handle 20 is moved towards the first 12 end of the shaft 11 as shown in FIG. 2, the ejector plate 19 removes the weed which is secured by the flat spring 18 and blade 17.

FIGS. 1 to 6 also show the bottom side 17d of the cutting blade 17 which includes a wedge 24. The wedge 24 is mounted on the bottom side 17d of the cutting blade 17 by rivets 24a. A bridge 25 is mounted between the bottom 17d side of the blade 17 and the wedge 24. The wedge 24 provides an upward lift in digging the weeds from the ground as the device 10 is pushed into the ground. Preferably the device 10 is used for lawn weeds, such as dandelions and buckhorn and the like.

The design of the extracting device 10 makes it convenient to remove the weed for disposal as it is cut from the ground thereby eliminating any bending or squatting. The weed extracting device 10 operates by placing the cutting edge 11e on blade 17 at the base of the plant and pushing down under the plant to cut the root. As the blade 17 is being inserted into the ground, the wedge 24 mounted on the bottom side 17d of the blade 17 helps to free the weed from the grass as the tool is pushed into the ground. The flat spring 18 is positioned over the upper portion of the plant holding it firmly against the top side 17c of the cutting blade 17 as it is cutting through its root. The device 10 with the weed held firmly against the blade 17 is moved over to a container (not shown) and released. This is done by moving the moveable handle 20 forward and through the rod 22 in the inside portion 11c of the shaft 11 causing the ejector plate 19 to move from the top end 17a to the bottom end 17b of the cutting blade 17 as shown in FIG. 2. The flat spring 18 is disengaged from the blade 17 and pushed off the blade 17 by the ejector plate 19 allowing the weed to be removed from the device 10 and enabling it to drop into the container or desired area. When the moveable handle 20 is released, the re-extension spring 23 returns the ejector plate 19, the handle 20, rod 22 and the flat spring 18 to their rest positions with the ejector plate 19 against the top end 17a of the cutting blade 17 as particularly shown in FIGS. 1 to 6.

The device 10 is also preferably constructed to include the pointed tip 18a and the coiled spring 26 secured around the flat spring 18. The pointed tip 18a picks up the litter and the coiled spring 26 removes the litter to a container when the handle 20 is pushed along the axis.

The weed extracting device 10 is particularly beneficial for those individuals with back problems who enjoy doing yard work. It provides an alternative to the use of toxic chemicals in the yard. Also the flat spring 18 and the ejector plate 19 may be easily and quickly removed for replacement or cleaning purposes. This is accomplished by releasing the hook 22a of rod 22 from the ejector plate 19, removing sleeve 27 and sliding the ejector plate 19 from the blade 17.

Various means can be used to move the ejector plate 19 on the blade 17. The handle 20 is preferred. It will be appreciated that the device can be used without an ejector plate.

It is intended that the foregoing description be only illustrative of the present invention and that the present invention be limited only by the hereinafter appended claims.

I claim:

1. In a tool for cutting and extracting weeds from the ground by means of a blade means with a cutting edge provided at a first end of an elongate shaft means and a gripping portion at a second opposite end of the shaft means wherein the blade means is inserted into the ground to cut the weed, the improvement which comprises:

an elongate resilient retaining means with an attached end mounted on the first end of the shaft means and a free end opposite the attached end, wherein the resilient means extends over most of the blade means, is in contact with the blade means adjacent the cutting edge and at the free end curves away from the cutting edge and wherein the weed is grasped between the resilient means and the blade means during and after cutting of the weed.

2. The tool of claim 1 wherein the resilient means is a flat spring with a sharp point at the free end.

3. The tool of claim 1 wherein a wedge means is provided on the blade means adjacent the cutting edge and between the blade means and the ground to facilitate lifting the cut weed from the ground by pushing the shaft means towards the ground.

4. The tool of claim 1 wherein an ejector mechanism means is provided between the shaft and blade means for lifting the resilient means from the weed to release the weed.

5. An improved tool for cutting and extracting weeds from the ground which comprises:
   (a) an elongate shaft means having a longitudinal axis and opposed first and second ends along the axis;
   (b) a flat blade means having top and bottom ends and top and bottom sides mounted on the first end of the elongated shaft means parallel to the axis, wherein the bottom end of the blade means has a weed cutting edge; and
   (c) a flat retaining spring means with a connected end attached to the first end of the elongate shaft and with a free end extending from the connected end over the top side and between the top and bottom ends of the blade and in contact with the blade adjacent the cutting edge and curved away from the cutting edge at the free end, wherein the weed is grasped between the blade means and the flat spring means during and after cutting of the weed by the blade.

6. The tool of claim 5 wherein the flat retaining spring means has a point at the free end.

7. The tool of claim 5 wherein the bottom side of the blade means supports a wedge means leading from adjacent the cutting edge towards the first end of the shaft means which aids in extracting the weeds by lifting the weed.

8. The tool of claim 5 wherein an ejector mechanism means is provided on the shaft means and blade means for lifting the flat retaining spring means from the weed to release the weed.

9. An improved tool for cutting and extracting weeds from the ground which comprises:
   (a) an elongate shaft means having a longitudinal axis with opposed first and second ends along the axis;
   (b) a flat blade means having top and bottom ends and top and bottom sides mounted on the first end of the elongate shaft means parallel to the axis, wherein the bottom end of the blade means has a weed cutting edge;
   (c) a flat retaining spring means with a connected end attached to the first end of the elongated shaft and with a free end extending from the connected end over the top side and between the top and bottom ends of the blade so as to be in contact with the blade adjacent the cutting edge and curved away from the cutting edge at the free end wherein the weed is grasped between the blade means and the flat spring means during and after cutting of the weed by the blade;
   (d) an ejector plate means moveably mounted adjacent the top side of the blade so as to be linearly moveable towards and back from the bottom end of the blade parallel to the axis and supporting the flat spring, wherein the flat spring is lifted from contact with the blade when the ejector means is moved towards the bottom end to eject the weed grasped between flat spring means and blade means from the tool; and
   (e) a linearly moveable handle means mounted between the first and second ends and along the axis of the elongate shaft means and connected to the ejector plate means to move the ejector means towards and away from the bottom end of the blade means.

10. The tool of claim 9 wherein the ejector plate means is moved away from the bottom end of the blade means by a coil spring means mounted between the shaft means and the handle means.

11. The tool of claim 9 wherein a hand grip means is provided on the second end of the shaft means.

12. The tool of claim 9 wherein the handle means is tubular and supported around the shaft means which is tubular with a rod leading from the handle means through the inside of the shaft means to the ejector plate means so as to allow the movement of the handle means, rod and ejector plate means together.

13. The tool of claim 9 wherein the flat retaining spring means is mounted through an aperture in the ejector plate means so as to guide the spring means when lifted by the ejector plate means.

14. The tool of claim 9 wherein the bottom side of the blade means supports a wedge means leading from adjacent the cutting edge towards the first end of the shaft means which aids in extracting the weeds after cutting by pushing the shaft means towards the ground.

15. The tool of claim 14 wherein the wedge means is a resilient flat strip with opposed ends attached to the blade means and the shaft means with a bridge mounted on the blade between the opposed ends supporting the strip.

16. The tool of claim 9 wherein the ejector plate means is moveably supported by the blade means.

17. The tool of claim 9 wherein the handle means is mounted about midway between the first and second ends of the shaft means.

18. The tool of claim 9 wherein a coil spring is mounted on the ejector plate means and around the flat retaining spring means with a length such that the coil spring extends past free end of the retaining spring means when the ejector plate means is moved to the bottom end and wherein the free end of the retaining spring means has a pointed tip.

19. The tool of claim 9 wherein the handle means is tubular and supported around the shaft means which is tubular with a rod leading from the handle means through the inside of the shaft means to the ejector plate means so as to allow movement of the handle means, rod and ejector plate means parallel to the axis and wherein the bottom side of the blade means supports a wedge means leading from the first adjacent the cutting edge towards the first end of the shaft means which aids in extracting the weeds after cutting by pushing the shaft means towards the ground.

20. The tool of claim 19 wherein the ejector plate means is supported by the blade means.

* * * * *